(12) United States Patent
Davis

(10) Patent No.: US 6,800,239 B2
(45) Date of Patent: Oct. 5, 2004

(54) METHOD OF MANUFACTURING A TWO PIECE SPORTS RACQUET

(75) Inventor: Stephen J. Davis, Treviso (IT)

(73) Assignee: Prince Sports, Inc., Bordentown, NJ (US)

( * ) Notice: Subject to any disclaimer, the term of this patent is extended or adjusted under 35 U.S.C. 154(b) by 0 days.

(21) Appl. No.: 10/084,583

(22) Filed: Feb. 26, 2002

(65) Prior Publication Data

US 2003/0162613 A1 Aug. 28, 2003

(51) Int. Cl.[7] ............................................. B29C 70/44
(52) U.S. Cl. ....................... 264/516; 264/257; 264/258; 264/314; 264/317; 264/324
(58) Field of Search .................. 264/257, 258, 264/512, 513, 314, 317, 324, 516

(56) References Cited

U.S. PATENT DOCUMENTS

| | | | |
|---|---|---|---|
| 3,901,507 A | | 8/1975 | Santini-Ormieres et al. |
| 3,930,920 A | * | 1/1976 | Kicherer ...................... 156/156 |
| 4,114,880 A | * | 9/1978 | Cecka ......................... 273/73 G |
| 4,183,776 A | * | 1/1980 | Staub et al. ................. 156/156 |
| 4,793,958 A | * | 12/1988 | Mott ........................... 264/274 |
| 4,842,798 A | * | 6/1989 | Mott ........................... 264/219 |
| 4,913,434 A | | 4/1990 | Fischer |
| 4,935,185 A | | 6/1990 | Mott |
| 5,060,944 A | | 10/1991 | Janes |
| 5,143,669 A | * | 9/1992 | Mott ........................... 264/103 |
| 5,234,657 A | * | 8/1993 | Hong ........................... 264/516 |
| 5,242,162 A | | 9/1993 | Hong |
| 5,516,100 A | | 5/1996 | Natsume |
| 5,540,877 A | * | 7/1996 | Repetto et al. .............. 264/513 |
| 5,922,255 A | * | 7/1999 | McLeod ..................... 264/40.1 |
| 5,993,337 A | * | 11/1999 | Janes et al. ................. 473/539 |
| 6,071,203 A | | 6/2000 | Janes et al. |

FOREIGN PATENT DOCUMENTS

| | | |
|---|---|---|
| EP | 343 507 | 5/1989 |
| GB | 2150444 | 7/1985 |
| JP | 06-105933 | * 9/1992 |
| WO | WO 81/03431 | 12/1981 |

* cited by examiner

Primary Examiner—Stefan Staicovici
(74) Attorney, Agent, or Firm—Skadden, Arps, Slate, Meagher & Flom LLP

(57) ABSTRACT

A composite sports racquet frame is made by placing a first prepreg tube into a first mold plate and a second prepreg tube into a second mold plate. A plurality of pin plates, each having a plurality of pins which are at least substantially parallel to one another, are secured to the mold plate so that, when the mold is closed, the pins extend between the two tubes. The tubes are pressurized to assume the shape of the mold and contact one another, and the mold is heated to allow resin to flow between the tubes as they cure, the pins forming pin holes in the frame. Once cured, the frame is removed from the mold, and the pins are withdrawn. If desired, the ends of the tubes forming the handle section can be kept separate from one another during the molding process, by using a removable mold plate. In this manner, not only do the two tubes become integral with one another, at least in the head portion, but string holes do not need to be drilled after the racquet is molded.

18 Claims, 10 Drawing Sheets

METHOD OF MANUFACTURING A TWO PIECE SPORTS RACQUET

BACKGROUND OF THE INVENTION

The present invention relates to sports racquets such as tennis racquets, squash racquets, badminton racquets, and racquetball racquets, which have hollow tubular frames made of composite materials such as "graphite". High performance sports racquets have a hollow tubular wall made of graphite material. To make such racquets, an elongated tube of pre-preg, formed of uncured graphite, is placed in a mold in the desired shape of the racquet frame. A bladder placed inside the pre-preg tube is inflated, such that the pre-preg assumes the shape of the mold, and the mold is heated to cure the epoxy resin and harden the frame.

After the frame is made, holes are drilled through the opposing walls of the tubular frame to support the ends of the racquet strings. If left uncovered, the sharp edges of the string holes would cause serious string breakage problems. For such reason, composite sports racquets employ plastic grommet strips to prevent direct contact between the strings and the holes in the frame. The grommet strips ride in a stringing groove formed along the outside surface of the racquet head portion, and contain a plurality of hollow grommet pegs, which extend through the holes in the frame. When the racquet is thereafter strung, the strings exit through the hollow barrels of the grommet pegs, and bear against the grommet strip along the outside of the racquet until reaching the next string hole, in this manner avoiding direct contact with the graphite frame.

Over the years, newer, stiffer frame materials, together with advances in molding techniques, have allowed composite sports racquets to become increasingly light. Today's graphite tubular frames as molded are very strong and very stiff, even with very thin wall thicknesses. However, when racquet string holes are subsequently drilled in the racquet, carbon fibers are broken and the frame is weakened locally. This problem is exacerbated by the fact that the string holes must have a diameter large enough not just for a string, but for a plastic grommet peg. As frame walls have become increasingly thin, the process of drilling the string holes can weaken the frame significantly, to the point where the frame is unable to support the high forces of the tensioned strings, resulting in strings pulling through the walls of the frame tube.

Commonly owned U.S. Pat. No. 6,071,203 discloses a two-piece sports racquet comprising a tubular upper frame half and a tubular lower frame half. The two racquet halves are molded separately from one another, and then bonded together, along opposed walls, using epoxy. The opposed walls of the two racquet halves are molded with half cylindrical channels which, when the two halves are joined, form the string holes of the frame, thereby eliminating the need to drill string holes and thereby weakening the frame. Also, when the two racquet halves are joined, the opposed walls become an internal wall in the frame which is oriented parallel to the direction of the string force on the frame, thereby further helping to prevent string pull-through.

While the invention disclosed in U.S. Pat. No. 6,071,203 provides a beneficial improvement in sports racquets, it would be desirable to provide a two piece-racquet having the same structural advantages, but without the need to bond two racquet halves together following molding.

BRIEF SUMMARY OF THE INVENTION

In a method for making a composite sports racquet frame according to the invention, a mold is provided having first and second mold plates which, when joined, define a mold cavity in the shape of a sports racquet. A first tube of a material suitable for forming a racquet frame, such as a fiber-reinforced resin, is placed in the first mold plate. A second tube of such material is placed in the second mold plate. A plurality of pin plates, each having a plurality of pins which are preferably at least substantially parallel to one another, are secured to the first mold plate so that the pins lie on top of the first tube.

After coupling a compressed air source to each of the tubes, the mold plates are secured to one another so that the first and second tubes contact one another at least in the regions to either side of the pins. The mold is then heated, while at the same time pressurizing the tubes, to form a racquet frame in which the tubes are joined to one another at least in the regions adjacent to the pins.

Preferably, the tubes are made of a composite material having a component, such as epoxy resin or thermoplastic, which, when subjected to the heat and pressure of the mold, will flow. In this manner, during molding the contacting portions of the two tubes will fuse together to form a common, integral, internal wall.

After the molded frame has been removed from the mold plates, the pins are pulled out of the frame, the pins thereby forming string holes in the frame.

Preferably, the pin plates forming the string holes in the head portion of the racquet are disposed on the outside surface of the head portion, so that the pins project inwardly. The base of the pins, i.e., where the pin project from the pin plates, are contoured so that the string hole openings formed by the pins along the outside surface of the racquet are rounded, thereby reducing the chance of string breakage.

Preferably, the tubes, when in the mold, alternately contact one another and a pin along the entire head portion of the frame. Preferably, the ends of the tube which will form the racquet handle portion are kept separated from one another during molding, by using a removable mold plate.

Also, preferably, the inner surface of the pin plates, from which said pins project, forms part of the mold cavity, e.g., to define a string groove extending along the outside of the head portion of the frame between string holes.

For a better understanding of the invention, reference is made to the following detailed description of the preferred embodiments of the invention, taken in conjunction with the drawings accompanying the application.

DETAILED DESCRIPTION OF THE INVENTION

Figure 1:
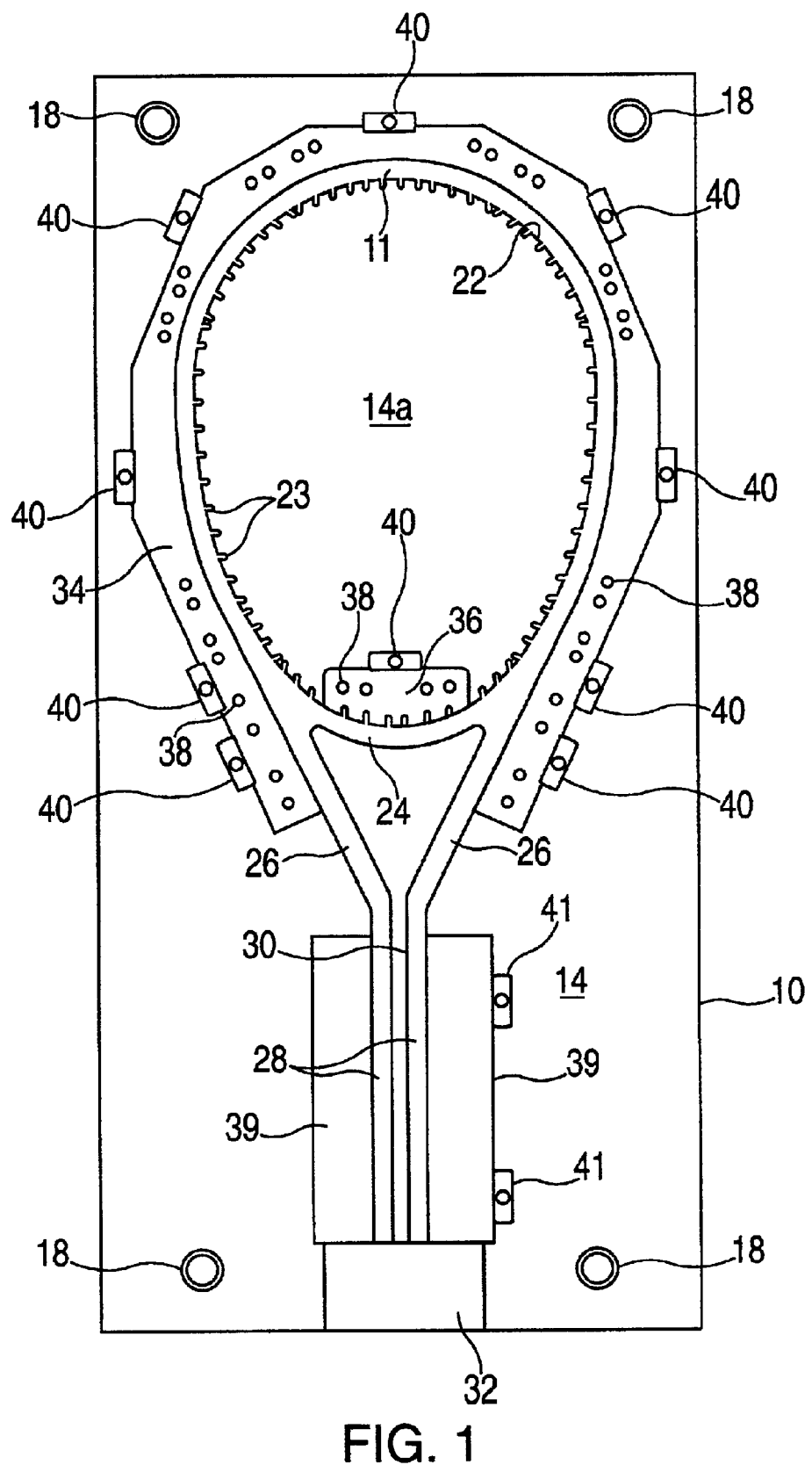
FIG. 1 is a plan view of the bottom half of a mold for making a sports racquet according to the invention.
Figure 2:
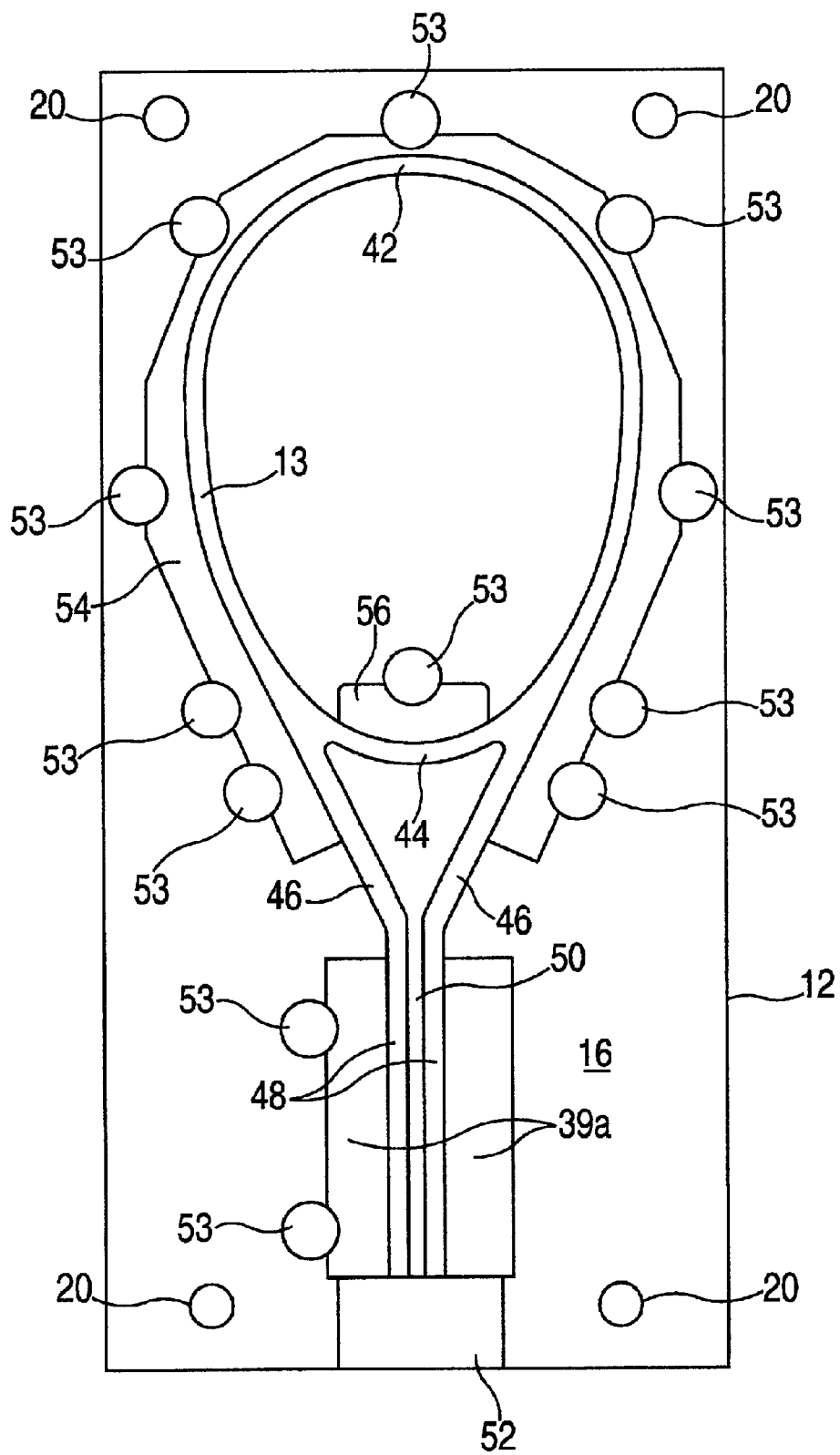
FIG. 2 is a plan view of the upper half of such mold.

FIG. 1 shows a mold plate 10 which forms the bottom half of a mold for making a tennis racquet. FIG. 2 shows a second mold plate 12 which forms the upper half of the mold.

The bottom mold plate 10 and upper mold plate 12 have generally flat upper surfaces 14, 16, respectively. The bottom mold plate 10 has a plurality of dowels 18 which are received in corresponding holes 20 in the upper mold plate 12 when the molds are brought together.

The bottom mold plate 10 includes a mold cavity 11 in the shape of a tennis racquet half (i.e., if the racquet were cut in half through a central plane parallel to the string bed), including a generally oval head portion 22, an arcuate throat bridge portion 24, converging shaft portions 26, and handle portions 28. As shown, the handle portions 28 of the mold are separated from one another by a wall portion 30. An enlarged cutout 32 is provided at the ends of the handle portions 28.

In addition to the mold portions 22, 24, 26, and 28, a sunken ledge 34, which lies below the plane of the surface 14 but which is not as deep as the mold portions 22, 24, 26, and 28, extends around the outside of the mold portion 22 and part of the mold portions 26. A second sunken ledge 36 adjoins the throat bridge portion 24.

A plurality of dowels 38 (only some of which are numbered on FIG. 1) extend upwardly from the bottom surface of the sunken ledges 34, 36. In addition, a plurality of latches 40 are pivotably secured to the plate surface 14 and spaced about the head and throat portions 22, 24 of the mold cavity 11 directly adjacent the sunken ledges 34, 36. In the rotational position shown, the latches 40 expose the two ledges 34, 36.

The head and throat mold portions 22, 24 surround a generally oval portion 14a of the upper surface 14 of the bottom mold plate 10. A plurality of thin grooves 23, described below in greater detail, extend from the mold portions 22, 24 inwardly toward the center portion 14a.

As also shown in FIG. 1, a pair of sunken ledges 39 are formed in the surface 14 on either side of the handle portions 28 of the mold. Latches 41 are pivotably mounted to the side of one of the ledges 39. The upper surface of the wall portion 30 is preferably co-planar with the ledges 39.

Referring to FIG. 2, the upper mold plate 12 includes a mold cavity 13 in the shape of a tennis racquet half and preferably is the mirror image of the mold cavity 11 in the bottom mold plate 10. Thus, the mold cavity 13 in the upper mold plate also includes a generally oval head portion 42, an arcuate throat bridge 44, converging shaft portions 46, and handle portions 48. As shown, the handle portions 48 of the mold are separated from one another by a wall portion 50. An enlarged cutout 52 is provided at the ends of the handle portions 28. The mold portions 42, 44, 46, 48 in the upper mold plate 12 are located such that, when the dowels 18 of the bottom mold plate 10 are inserted in the holes 20 of the upper mold plate 12, the mold portions 42, 44, 46, 48 will lie opposite to the corresponding mold portions 22, 24, 26, 28 in the bottom mold plate 10, thereby forming a closed mold cavity 11, 13 in the shape of a tennis racquet.

The upper mold plate 12 includes a sunken ledge 54, which lies below the plane of the surface 16 but which is not as deep as the mold portions 42, 44, 46, and 48. The ledge 54 extends around the outside of the mold portion 42 and part of the mold portion 46. A second sunken ledge 56 adjoins the throat bridge mold portion 44. The ledges 54 and 56 formed in the upper mold plate 12 are mirror images of the ledges 34, 36 of the bottom mold plate 10 and are positioned to lie opposite to the ledges 34, 36 when the dowels 18 of the bottom mold plate 10 are inserted into the holes 20 of the upper mold plate 12. A pair of sunken ledges 39a are formed in the upper surface 16 so as to be opposite to the ledges 39 in the bottom mold plate 10 when the plates are joined.

Finally, a plurality of holes 53 are formed in the upper surface 16 of mold plate 12 and located so that, when the two mold plates 10, 12 are joined, the latches 40, 41 of the bottom mold plate 10 are received in the holes 53 of the upper mold plate 12, thus allowing the plate surfaces 14, 16 of the respective mold plates to abut against one another.

Figure 3:
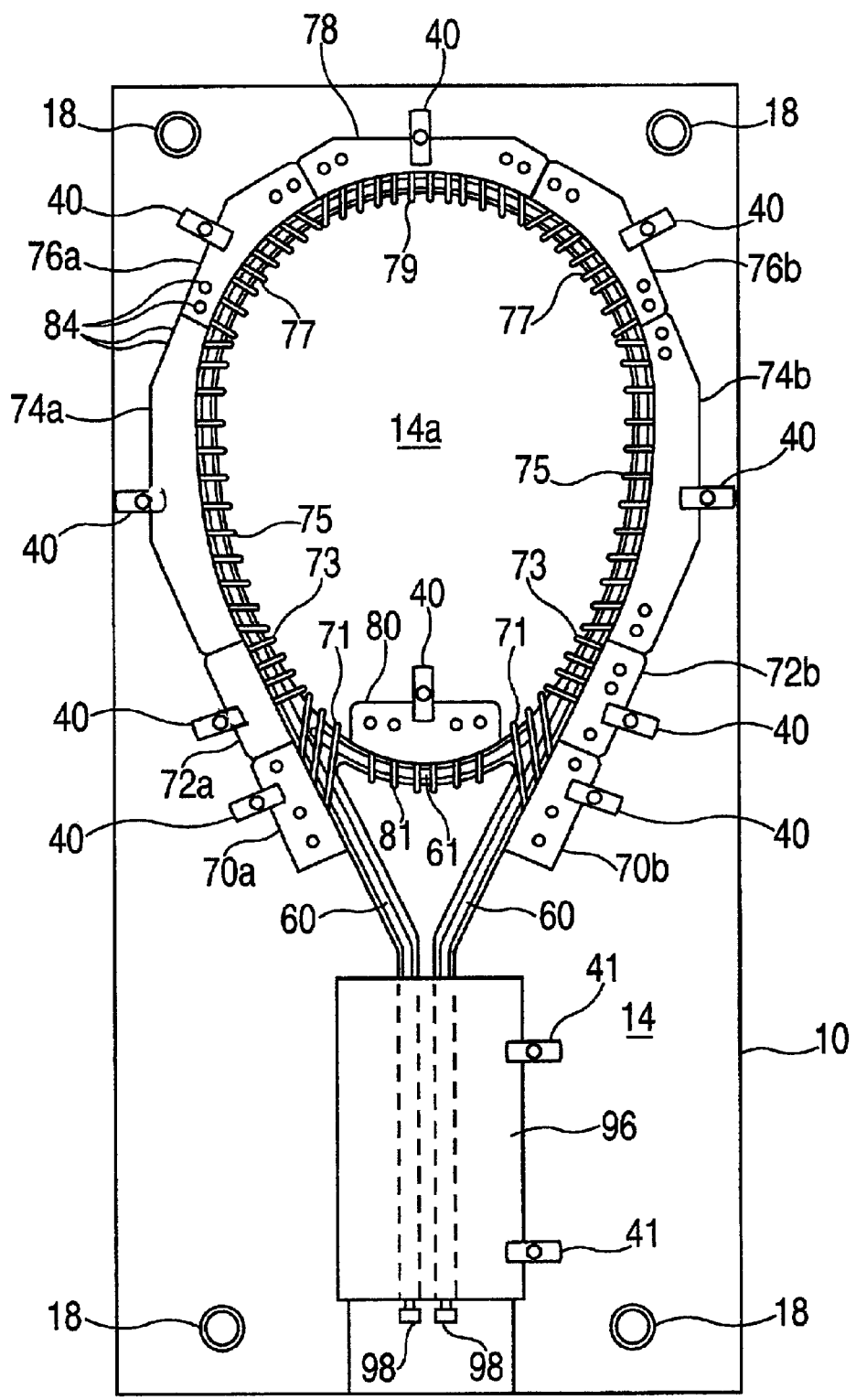
FIG. 3 is a plan view of the bottom half of the mold containing a prepreg tube, various removable pin plates, and a handle plate secured in place.
Figure 4:
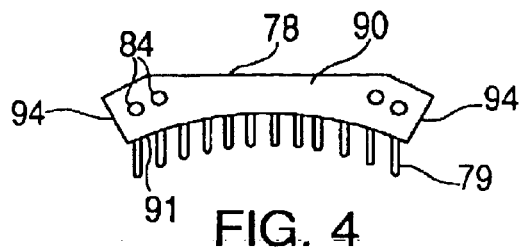
FIGS. 4–9 are plan views illustrating illustrate the various pin plates used in the mold half of FIG. 3.
Figure 5:
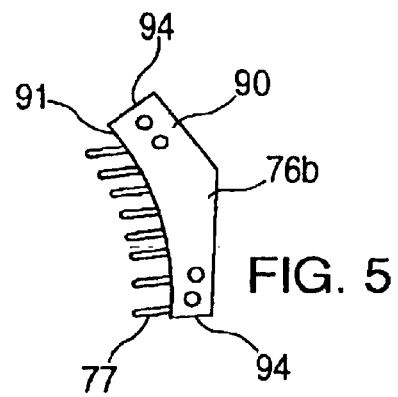
Figure 6:
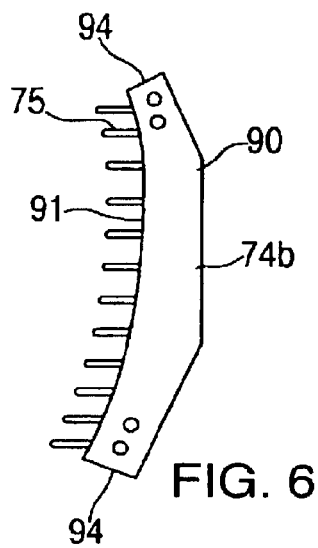
Figure 7:
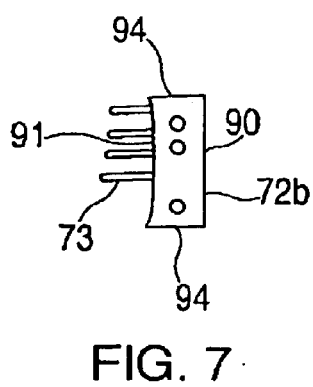
Figure 8:
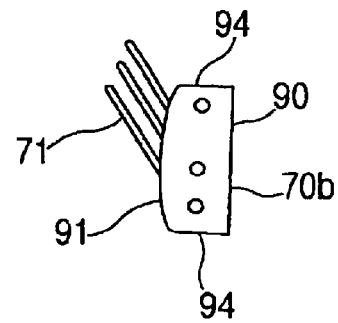

FIG. 3 shows the bottom mold plate 10 after a prepreg tube 60 has been laid in the mold portions 22, 26, 28. The prepreg tube 60 may be prepared in a conventional fashion, in which strips of uncured, fiber-reinforced epoxy resin are wrapped on a mandrel to form a flexible tube. In accordance with conventional practice, an additional section 61 of tubing is laid in the throat mold section 24 and is joined to the opposite sides of the tube 60 (e.g., by wrapping additional prepreg strips around the joints) to form the throat piece.

After the tube 60 and throat section 61 have been laid in the mold portions 22, 24, 26, 28, a plurality of pin plates 70a, 70b, 72a, 72b, 74a, 74b, 76a, 76b, and 78 are positioned in the sunken ledge 34. Another pin plate 80 is placed in the ledge 36. Each pin plate includes a plurality of holes 84 which fit over the dowels 38 of the bottom mold plate 10, thereby fixing the position each pin plate.

Each pin plate also includes a plurality of pins 71, 73, 75, 77, 79, and 81. The pins of each pin plate extend parallel to one another. As shown in FIG. 3, when the pin plates 70a–b, 72a–b, 74a–b, 76a–b, 78 and 80 are positioned in the ledges 34, 36, the pins 71, 73, 75, 77, 79, and 81 cross the open, upper end of the mold portions 22 and 24 on top of the prepreg tube 60 and throat section 61, respectively. As shown more clearly in FIG. 10, which shows pin plates 74b, 76b, and 78, the ends of the pins 75, 77, 79 are received in the grooves 23 formed in the upper surface 14a of the bottom mold plate 10. After the plates 70a–b, 72a–b, 74a–b, 76a–b, 78 and 80 have been positioned in the ledges 34, 36, the latches 40 are rotated to secure the plates against movement.

The pin plates 70a–b, 72a–b, 74a–b, 76a–b, 78 and 80 are shown in greater detail in FIGS. 4–10. Each plate has a body portion 90 and a plurality of parallel pins 71, 73, 75, 77, 79, 81, thus resembling a comb. The inner face 91 of each plate forms part of the mold surface for the racquet, and thus has the exact shape desired for the racquet. For example, the inner faces 91 of the various plates may extend into the mold space formed by the head portion 22 so as to form a stringing groove along the outside surface of the finished racquet. The opposite ends 94 of each pin plate are designed to abut either the end of an adjacent plate or, in the case of plates 70a–b and 80, an end wall of the ledge 34, 36.

Figure 10:
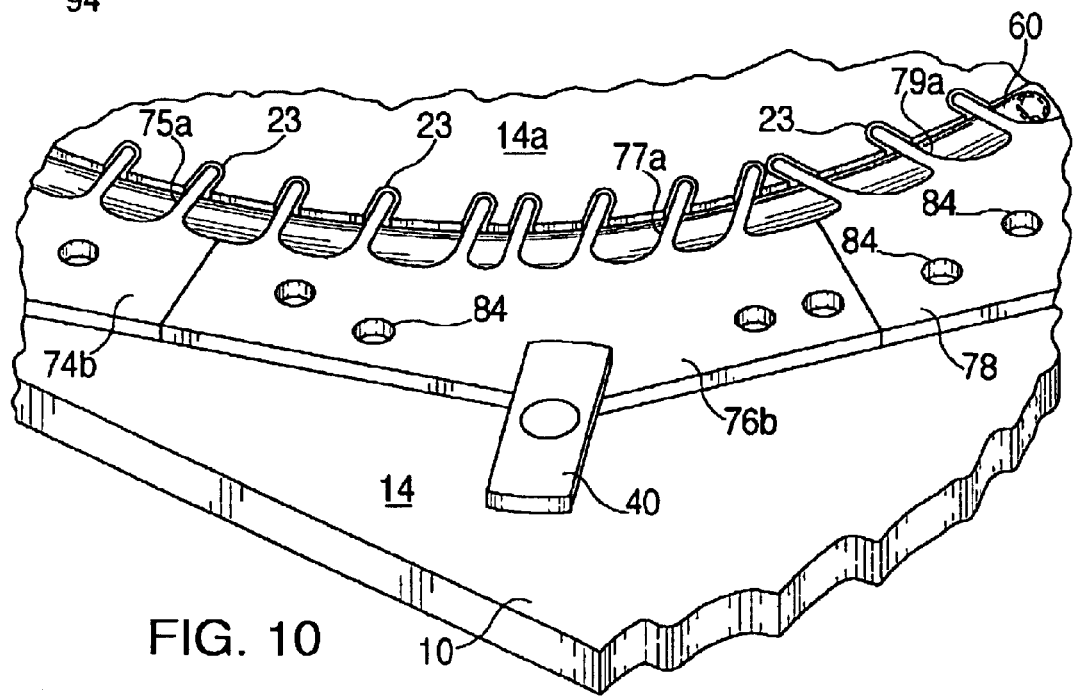
FIG. 10 is an enlarged, perspective view of a portion of the mold half of FIG. 3 along with several pin plates.

As shown in FIG. 10, the base 75a, 77a, and 79a of each pin 75, 77, 79 (as well as the remaining pins), i.e., where each pin joins the pin plate, is rounded. As described further below, when the racquet frame is molded, the pins form string holes in the frame. By rounding the base of the pins, the string holes openings along the outside of the frame will similarly be rounded.

Referring again to FIG. 3, a handle plate 96 is seated in the sunken ledges 39, over the handle portions of the prepreg tube 60, and locked in place with the latches 41. Finally, a pair of air nozzles 98 are inserted into the open ends of the tube 60. As shown, the cutout space 32 provides room to maneuver the nozzles 98 into place.

To form the racquet frame, the bottom mold plate 10 is prepared as described above, i.e., a prepreg tube 60 is placed in the mold cavity 11, the pin plates and handle plate are positioned as shown in FIG. 3, the latches 40, 41 are rotated 90 degrees to secure the pin plates and handle plate in place, and air nozzles 98 are inserted in the ends of the tube 60. A second prepreg tube and throat section, similar to prepreg tube 60 and throat section 61, are disposed in the upper mold plate 12, and air nozzles similar to air nozzles 98 are inserted in the open ends of the second tube. The two mold plates 10, 12 are then brought together so that the dowels 18 of the bottom mold plate 10 are received in the holes 20 of the upper mold plate 12. As the mold plates 10, 12 come together, the portions of the pin plates 70a–b, 72a–b, 74a–b, 76a–b, 78 and 80 and handle plate 96 which project above the plane of the surface 14 will be received in the respective sunken ledges 54, 56 and 39a of the upper mold plate 12, so that the surfaces 14, 16 lie flush against one another. The two mold plates 10, 12 are then clamped together in a known manner.

Once the mold is closed, it is heated to a suitable temperature to begin to cure the epoxy resin. At the same time, pressurized air is provided to the air nozzles to cause the two prepreg tubes to assume the shape of the mold. The pressurized air also forces the upper prepreg tube and throat section into contact with the lower prepreg tube 60 and throat section 61, except where the two tubes are separated by the pins 71. Due to the heat and pressure present in the mold, as the two tubes are curing, the resin of the tubes will tend to migrate, so as to form a unitary structure.

After the epoxy has been sufficiently cured, the mold is opened, the latches 41 are pivoted 90 degrees to their open position, and the racquet frame, along with the pin plates 70a–b, 72a–b, 74a–b, 76a–b, 78 and 80, and handle plate 96 are removed.

Once the racquet frame has been removed from the mold, the pin plates 70a–b, 72a–b, 74a–b, 76a–b, 78 and 80 can be withdrawn, one-by-one, from the frame, thereby withdrawing the pins 71. Also, the handle plate 96 can slide between the handle portions 100a–b and 100c–d so as to be removed.

Figures 9, 11:
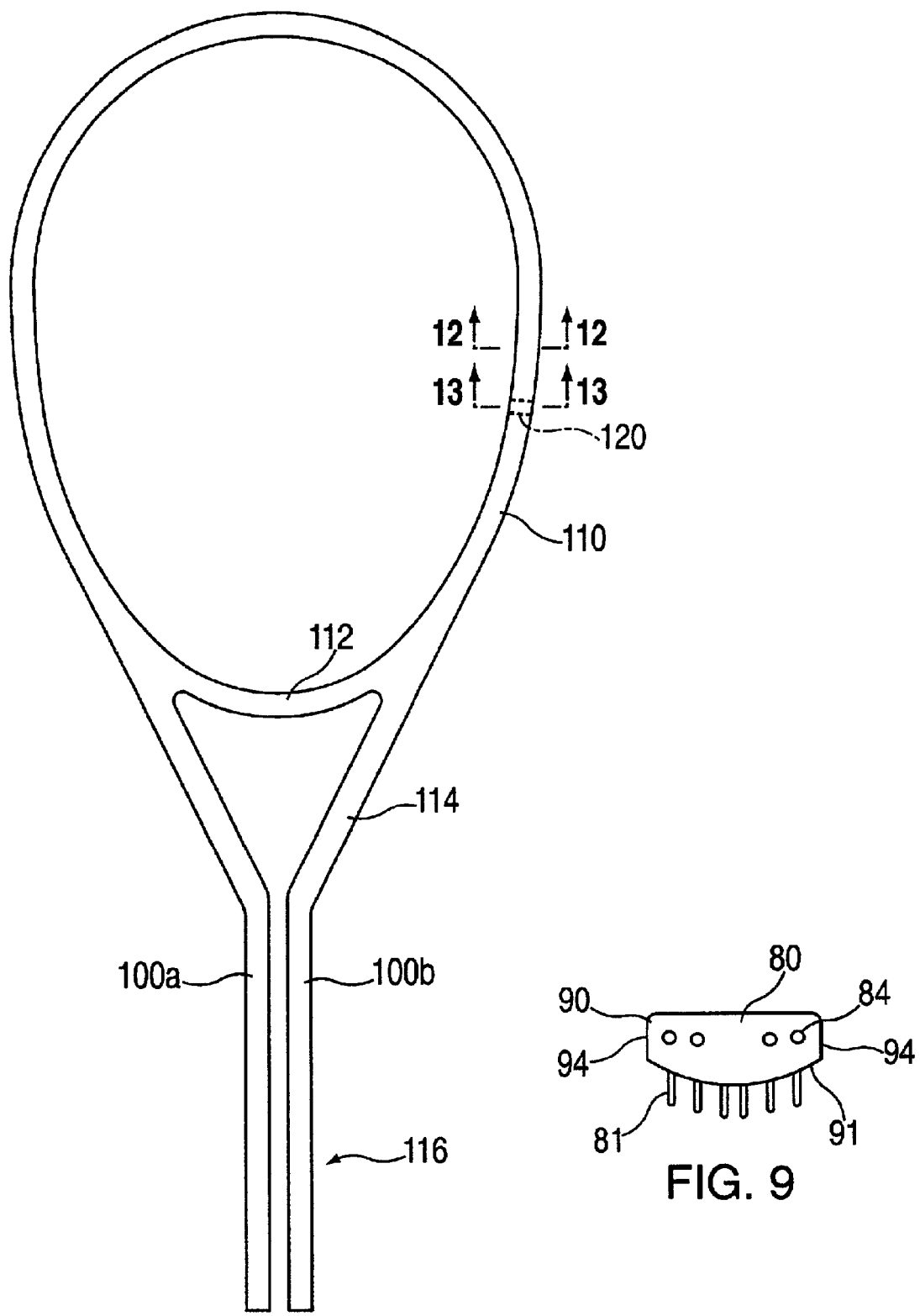
FIG. 11 is a plan view of a racquet frame molded with the mold halves and plates shown in FIGS. 1–9.
Figure 12:
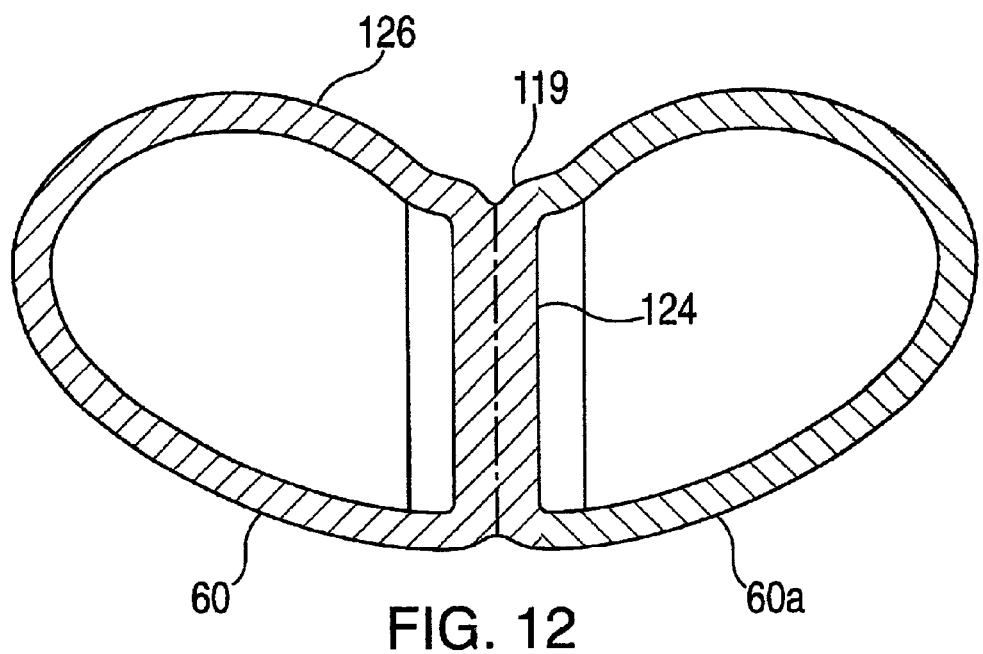
FIGS. 12 and 13 are cross sectional views of the frame of FIG. 10, taken through lines 12—12 and 13—13, respectively.

The molded frame is shown in FIGS. 11–14. As a result of this process, in the head portion 110, throat bridge 112, and shaft portions 114 of the frame, the upper and lower tubes are fused to one another, due to the curing process, to form a unitary frame member, except where the pins 71 have kept the tubes separated. FIG. 12 shows a cross section of the head portion 110 in which the lower tube 60 has become integral with the upper tube 60a (the broken line merely indicating the pre-molding boundary between the two tubes). As shown, a string groove 119 has been molded along the outside surface of the frame by the surfaces 91 of the pin plates.

Figure 13:
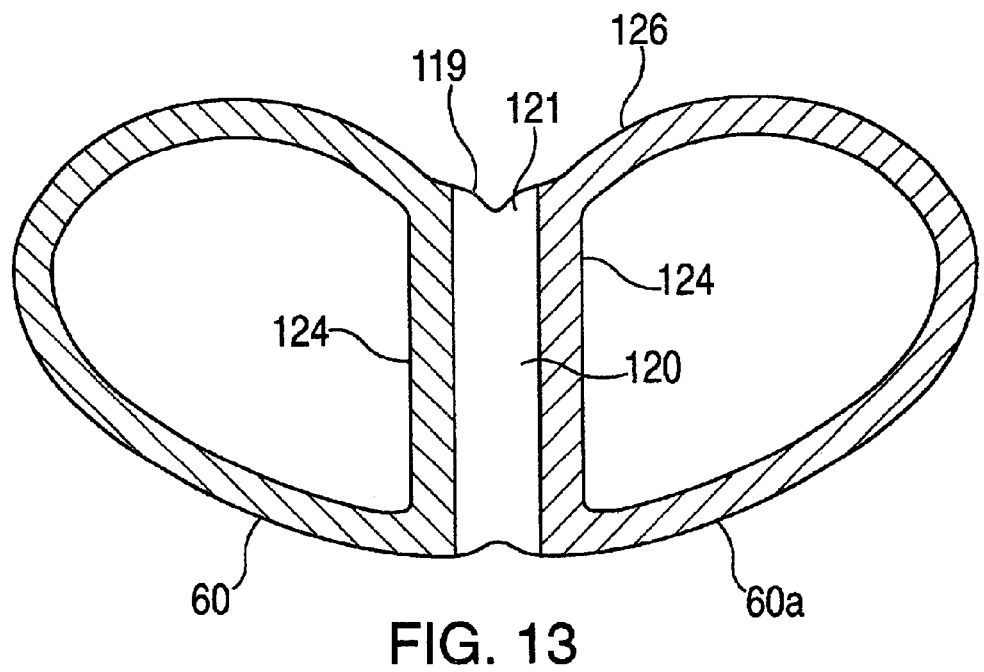

FIG. 13 is a cross section of the head portion 110 showing a string hole 120 which has been formed by one of the pins 75. As discussed above, by rounding the base of the pins, the opening 121 of the string hold 120 along the outside of the frame, where strings enter and leave the frame, will be rounded, thereby reducing the chance of damaging the string and reducing the need for grommet pegs.

When the racquet is strung, the strings will be disposed in the string groove 119 along the outside of the frame, and extend through the string holes 120. The tension of the strings tends to pull the outwardly facing wall 126 of the frame inwardly. As shown in FIGS. 12–13, the wall 124 formed when the two pre-preg tubes are molded extends is disposed directly below the string groove 119, and is oriented parallel to the direction of string force. Thus, the wall 124 effectively opposes the tendency of string pull-through.

In accordance with the present invention, it is not necessary to attach the two tubes to one another after molding. It is also not necessary to drill string holes, after the racquet has been molded, as in the case of conventional composite racquets. Finally, particularly where the hole openings 121 are rounded, as in FIG. 13, it is not necessary to employ grommet pegs to protect the strings, although grommet pegs may be used if desired.

Figure 14:
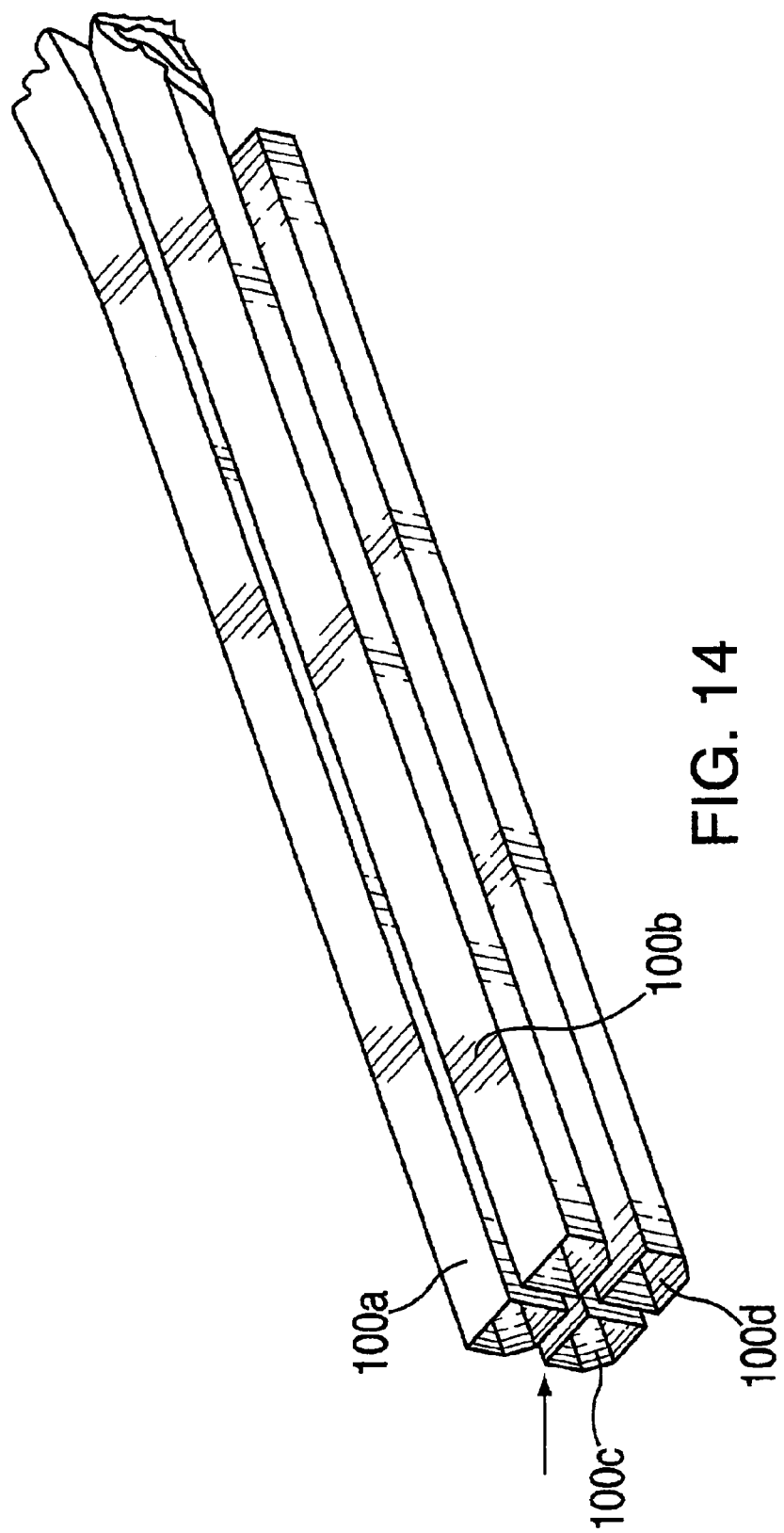
FIG. 14 is a perspective view of the end of the handle portion of the frame shown in FIG. 11.

As shown in FIGS. 11 and 14, the four ends 100a–d of the tubes, which form the handle portion 116 of the racquet frame, are separated from one another. A handle pallet (not shown) may be secured to the handle portion 116 in a known fashion, and a grip may be wound on to the handle pallet.

Other Alternative Embodiments

Figure 15:
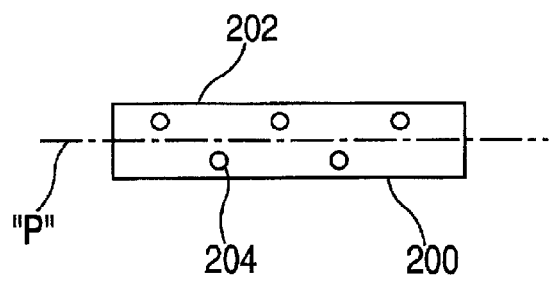
FIG. 15 is a front view of an alternative embodiment of pin plate, in which the pins lie in two different planes.

FIG. 15 shows an alternative embodiment of a pin plate 200, in which the pins are parallel to one another but not in the same plane. In the example shown in FIG. 15, the pins 202, 204 lie alternately above and below the plane "P" of the string bed. Pin plates such as pin plate 200 can be used to make a racquet with "splayed" stringing, such as described in U.S. SIR H1,710.

Alternatively, adjacent pins could be angled up or down, planar and convergent, or skewed (meaning neither parallel nor convergent). In such cases, the invention should incorporate one of the following modifications.

Figure 16:
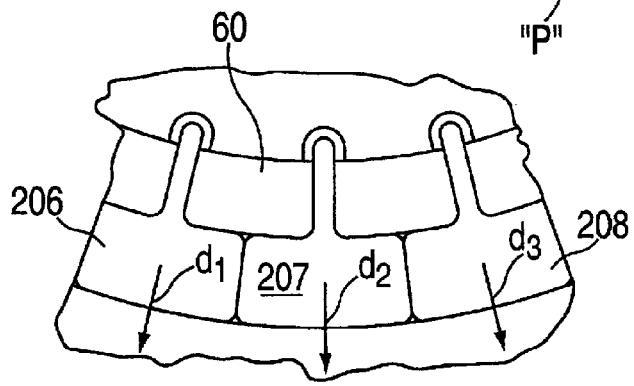
FIG. 16 is a plan view of a portion of the lower mold plate, prepreg tube, and pin plates according to another embodiment of the invention.
Figure 17:
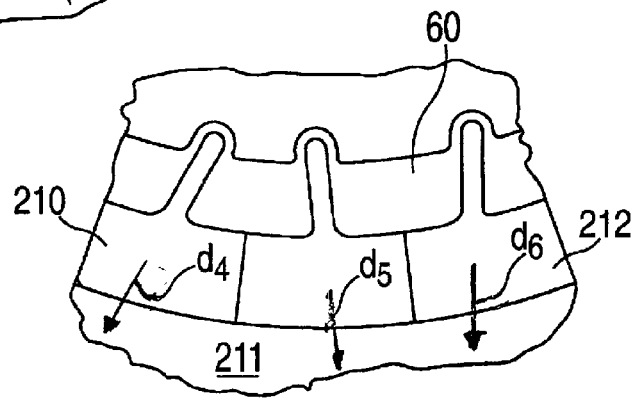
FIG. 17 is a plan view of a portion of the lower mold plate, prepreg tube, and pin plates according to still another embodiment of the invention.

(a) Each pin plate has only a single pin. This offers the flexibility of orienting each pin at the most desired angle and location. In the case of convergent pins, as shown in FIG. 16, the pin plates 206, 207, 208 can slide in a common plane, but in different directions d1, d2, and d3, when being removed from the racquet frame after molding. In the case of skewed pins, as shown in FIG. 17, each pin plate 210, 211, 212 has its own sliding plane specifically oriented to have the desired channel position and sliding direction d4, d5, d6.

(b) Each pin plate has at least two pins, but they have sufficient resiliency to bend when being pulled out of the frame; or (c) Each pin plate has a system that allows the pins to be withdrawn along their own axis.

Another modification which forms part of this invention is the use of fusible, or sacrificial, core material to form either pin plates or individual pins. The use of fusible cores in the formation of tennis racquets is described in U.S. Pat. No. 4,891,175. Such cores are used to help mold the frame, but can be removed after the frame material has hardened, e.g., by melting or washing away. In the present invention, similar materials could be used to form the pins used to mold in string holes, which pins are then removed after the frame has been cured.

Figure 18:
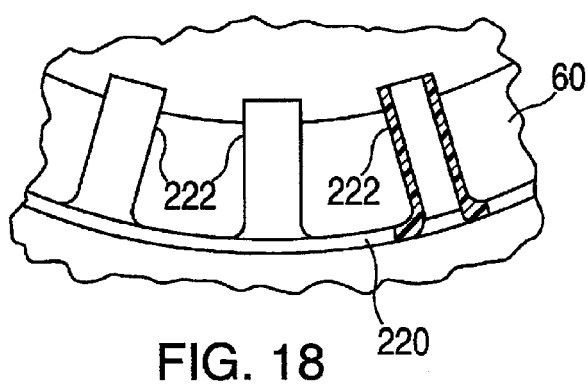
FIG. 18 is a plan view of a portion of the lower mold plate, prepreg tube, and grommet strip according to still another embodiment of the invention.

Another alternative embodiment according to the invention utilizes hollow plastic grommet pegs as the pins (as used herein, the term "pins" includes plastic grommet pegs as well the aforedescribed fusible core pins). In such an arrangement, illustrated in FIG. 18, a grommet strip 220, containing a plurality of hollow grommet pegs 222, is positioned in the mold in a manner similar to the pin plates, i.e., such that the grommet pegs 222 extend across the top surface of one of the prepreg tubes 60. The grommet pegs are positioned in the desired locations of the string holes. The top mold plate is then positioned so that the upper prepreg tube lies on top of the grommet pegs 222. When molded, the grommet strip 220 lies in the stringing groove. Because the grommet pegs 222 are not removed after molding, but are intended to become a permanent part of the frame, such grommet pegs 222 can be oriented at any desirable angle. As shown, the grommet pegs are oriented to be perpendicular to the frame's outer surface at each location.

Figure 19:
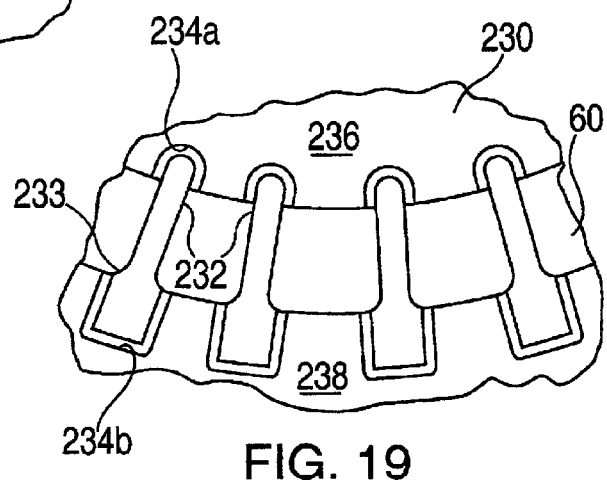
FIG. 19 is a plan view of a portion of the lower mold plate, prepreg tube, and pins according to another embodiment of the invention.

FIG. 19 shows another embodiment in which pin plates are not used. Rather, the mold plates, e.g., lower mold plate 230, are formed to secure opposite ends of individual pins 232. For examples, grooves 234a, 234b similar to grooves 23, could be formed both on the inside surface 236 and the outside surface 238 of the mold plate, with complementary grooves formed in the upper mold plate. The grooves 234a, 234b position the individual pins 232 at the desired locations. In this embodiment, the pins 232 can be oriented at any desired angle. After the frame has been molded and removed from the mold plates, the pins are removed, e.g., with a hammer or press. Preferably, the base 233 of one end of each pin 232 is radiused, so that the inlet to the string hole thus formed will be rounded. Where the base 233 is enlarged in cross section as shown, the pin 232 is removed in a direction towards its base end.

As a string enters or leaves a string hole on the outside surface of the frame, it bends at an angle of 90 degrees in order to extend along the outside surface of the frame to the next string hole. Thus, in the above embodiments, it is preferable to radius the inlet of the string hole lying on the outside of the frame so that the string does not encounter a sharp edge of the frame tube when bending. It is also preferable to mold a radius at the string hole opening on the inside surface of the frame as well.

Figure 20:
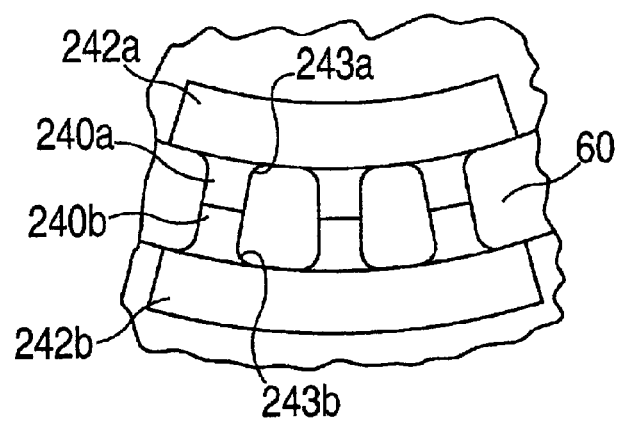
FIG. 20 is a plan view of a portion of the lower mold plate, prepreg tube, and pin plates according to another embodiment of the invention.

One way to do this, illustrated in FIG. 20, is to separate the pins into two sections 240a, 240b which meet somewhere in the middle of the molded frame cross-section. Each section 240a, 240b is secured to its own pin plate 242a, 242b. In this manner, the base 243a, 243b of each pin section 240a, 240b is rounded to produce a radius at both ends of the string hole thus formed.

Figure 21:
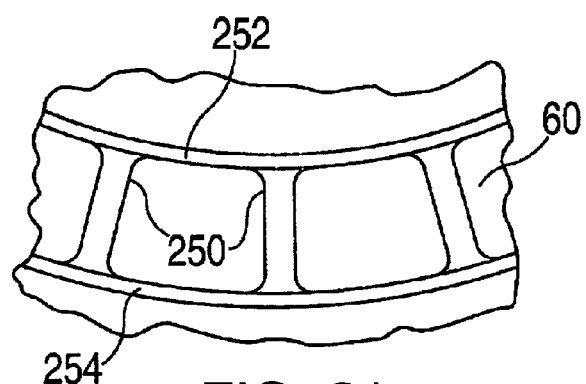
FIG. 21 is a plan view of a portion of the lower mold plate, prepreg tube, and sacrificial pins and spines according to another embodiment of the invention.

As an alternative, where a fusible core material is used to form the pins, the opposite ends of such pins can be round to produce the desired radius. For example, a lattice work design of pins 250 connected by two spines 252, 254 on the outside surface and inside surface, respectively, could be used, as shown in FIG. 21. The opposite ends of the pins 250, i.e., where the pins 250 are connected to the spines 252, 254 could be radiused so that the openings to the resulting string holes are rounded. Because the material is melted or washed away after the frame is molded, such pins 250 can be oriented at any desired angle. Moreover, the fact that both ends are curved does not prevent such pins 250 from being removed, because the material merely melts or otherwise disintegrates.

Figure 22:
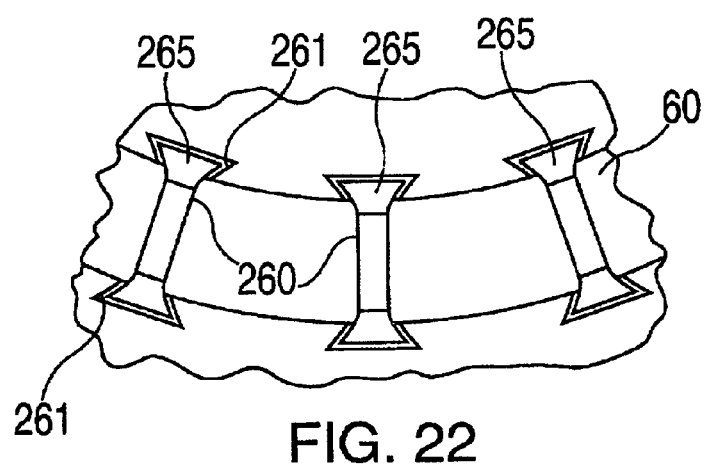
FIG. 22 is a plan view of a portion of the lower mold plate, prepreg tube, and pins according to yet another embodiment of the invention.

As another alternative, individual pins can be used to form the string holes, similar to the embodiment shown and described in connection with FIG. 22. However, instead of having pins 232 in which the outer end is radiused but the inner end is straight, as in FIG. 17, which will radius only the outer end of the string hole, both ends of the pins 260 are radiused. The mold plates are provided with complementary grooves 261 to receive the enlarged ends of the pins 260. At least one of the ends is formed so that the enlarged portion is removable. This may be accomplished, e.g., by providing a removable cone 265 on one or both of the ends. The cones would form the radii during molding, but at least one of the cones would be removable after molding to allow the pin to be pulled out.

Figure 23:
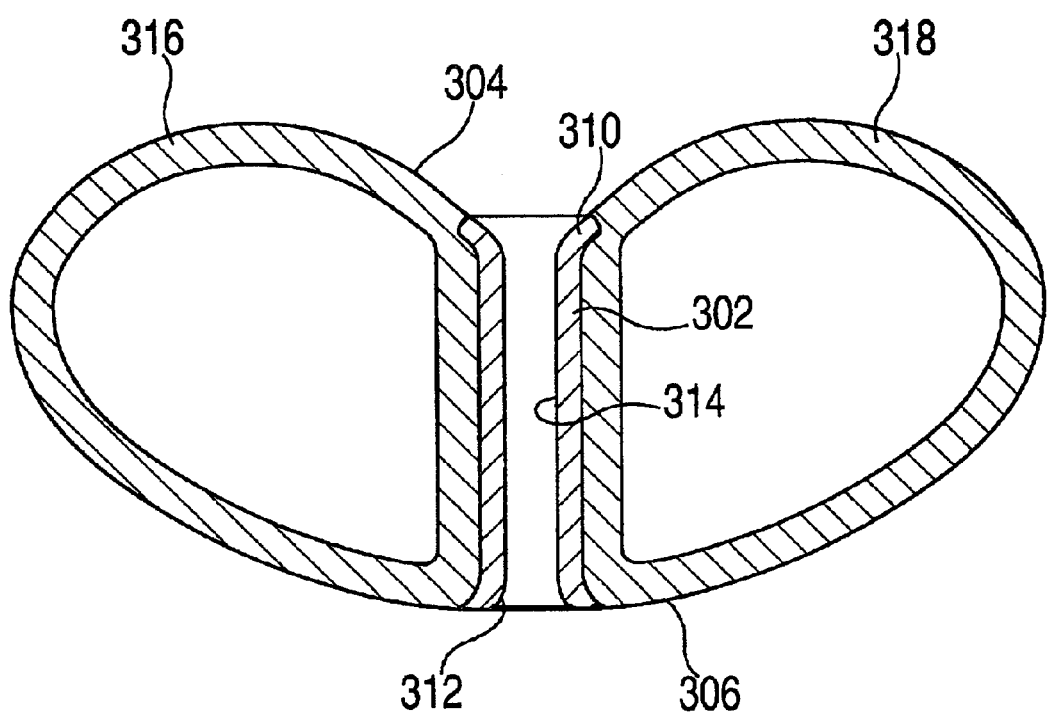
FIG. 23 is a view corresponding to FIG. 13 another embodiment of a tennis racquet frame.

FIG. 23 shows a cross section corresponding to FIG. 13 of another racquet frame 300. A plurality of hollow, tubular metal grommet pegs 302 (one of which is shown in FIG. 23) extend through the frame 300 from the outer surface 304 of the frame to the inner surface 306 of the frame. As shown, the opposite ends 310, 312 of each grommet peg 304 flare outwardly (i.e, in a flared bell, or trumpet, shape), so that the opposite ends of the interior walls 314 of each grommet peg 304 are rounded, as shown. In this manner, as the string enters and extends through the grommet peg 304, it will not encounter any sharp edges.

As shown in FIG. 23, the grommet pegs 304 are located between the upper tube 316 and the lower tube 318 of the two piece racquet. To form the racquet, after the prepreg tube for forming the lower tube 316 has been placed in the lower mold half, the metal grommet pegs 302 are positioned over the upper, exposed surface of the prepreg tube at the desired locations. The upper prepreg tube, for forming the upper tube 316, and its associated mold are then positioned over the lower mold, lower prepreg tube, and grommet pegs 302, and the frame is formed as in the other embodiments. Once the racquet halves are joined and molded, the flared shape of the opposite ends of the metal grommet pegs act to secure the grommet pegs 302 and prevent any axial motion. Metal grommet pegs have the advantage that they can be made relatively thin-walled and light, but such pegs will have a long life. If desired, however, grommet pegs similar to the grommet peg shown in FIG. 23, i.e., having flared opposite ends and which are permanently retained between the frame halves, may be made of other materials such as plastic.

The foregoing represent preferred embodiments of the invention. Variations and modifications will be apparent to persons skilled in the art, without departing from the inventive concepts disclosed herein. For example, while the process has been described as using tubes of uncured epoxy, other materials, including thermoplastic tubes, braided sleeves, or the like, may be employed. Also, the material used to make the upper racquet half need not be the same as the material used to make the lower racquet half, and the two racquet halves need not be symmetrical. Also, while the exemplary racquet frame includes a throat bridge, the process may be employed to form a frame that does not include a throat bridge. Finally, while the pins 71 of each pin plate are preferably parallel to one another to facilitate withdrawing the pins from the molded frame, such pins 71 can be non-parallel to one another, provided that they have sufficient resiliency to bend when being pulled out of the frame. As used herein, the term "substantially parallel" refers to pins which are sufficiently parallel to one another to allow the pins to be withdrawn from the frame without damaging the frame. All such modifications and variations are intended to be within the scope of the invention, as defined in the following claims.

What is claimed is:

1. A method for making a composite sports racquet frame comprising the steps of:
   providing a mold having first and second mold plates which, when joined, define a mold cavity in the shape of a sports racquet;
   placing a first tube of a material suitable for forming a racquet frame in said first mold plate;
   placing a second tube of a material suitable for forming a racquet in said second mold plate;
   providing a plurality of pin plates, wherein each pin plate includes a body portion and a plurality of pins which extend from said body portion in a direction parallel to one another, and which include distal ends spaced away from said body portion;
   securing said plurality of pin plates to said first mold plate so that said pins cross on top of said first tube, such that said pins lie at least substantially in a single plane, such that the pins of each pin plate extend at an angle different from the pins of the adjacent pin plates, and such that each of said distal ends is received in a groove in said first mold plate;
   coupling an air source to each of the tubes;
   securing said mold plates to one another so that said first and second tubes contact said pins and such that said tubes contact one another at least in regions to either side of said pins;
   heating said mold while pressurizing said tubes to form a racquet frame in which said tubes are bonded to one another at least in said regions adjacent said pins;
   removing said frame from said mold plates; and
   removing said pins from said frame, whereby said pins form string holes in said frame.

2. A method according to claim 1, wherein said mold cavity defines a racquet head portion, and wherein said tubes, when in said mold alternately contact one another and a pin along the entire head portion of the mold cavity.

3. A method according to claim 2, wherein said tubes have ends forming a handle portion, and wherein, when said frame is molded, said ends are kept separated from one another so that, after said frame is removed from said mold plates, said tubes, in the handle portion of said frame, have gaps between one another.

4. A method according to claim 1, wherein said body portions have a surface, from which said pins project, which forms part of the mold cavity.

5. A method according to claim 1, wherein said tubes are made of a composite material having a component which flows when heated such that, during molding, the tubes form an integral common wall.

6. A method according to claim 1, wherein said tubes are made of an uncured, fiber-reinforced resin.

7. A method according to claim 2, wherein at least some of the pin plates are positioned to the outer side of the head portion, wherein the pins of said at least some pin plates are joined to said body portions by a rounded base, thereby to form string holes having rounded openings along the outside of the frame.

8. A method according to claim 7, wherein all of the pin plates forming string holes between said first and second tubes are positioned to the outside of said head portion.

9. A method according to claim 8, wherein said mold plates include a sunken ledge to the outside of said first and second tubes, wherein the pin plates forming string holes between said first and second tubes are secured in said sunken ledge.

10. A method according to claim 1, wherein said pins have a first end adjacent to the outside of the frame and a second end adjacent to the inside of the frame, and wherein said pins have a shoulder at said first end in order to produce a radius at the inlet to the string holes.

11. A method according to claim 10, wherein said pins have a shoulder at their second end, such that both ends of the string holes are radiused, and wherein one of the two shoulders on each pin is removable.

12. A method according to claim 2, wherein each pin comprises first and second coaxial pin portions, wherein said first pin portions are secured to said body portions, wherein said body portions associated with pins forming string holes between said first and second tubes are positioned on the outside of the frame, and wherein said second pin portions are secured to a plurality of second body portions positioned on the inside of the frame.

13. A method according to claim 2, wherein said head portion includes a tip portion, a pair of opposed side portions, a pair of upper corner portions separating said tip portion and said side portions, a throat bridge portion, and a pair of lower corners separating said side portions from said throat bridge portion, and wherein said pin plates consist of a first pin plate for forming string holes in the tip portion, a second pin plate for forming string holes in said throat bridge portion, a first pair of pin plates for forming string holes in said side portions, a second pair of pin plates for forming string holes in said upper corner portions, and at least one pair of third pin plates for forming string holes in said lower corner portions, and further comprising the steps of, prior to molding, placing a throat bridge member in the throat bridge portion of each mold plate, and securing said second pin plate to one of said mold plates such that the pins of said second pin plate cross said throat bridge member.

14. A method according to claim 13, wherein two pairs of pin plates are used to form the string holes in said lower corner portions.

15. A method according to claim 13, wherein the racquet frame has a longitudinal axis, and wherein the pins in said first pair of pin plates extend perpendicular to said axis.

16. A method according to claim 15, wherein the pins in said first and second pin plates extend parallel to said axis.

17. A method according to claim 14, wherein the racquet frame has a longitudinal axis, and wherein the pins in said first pair of pin plates extend perpendicular axis.

18. A method according to claim 17, wherein the pins in said first and second pin plates extend parallel to said axis.

* * * * *